(12) United States Patent
Chia et al.

(10) Patent No.: US 6,617,078 B1
(45) Date of Patent: Sep. 9, 2003

(54) LITHIUM ION RECHARGEABLE BATTERIES UTILIZING CHLORINATED POLYMER BLENDS

(75) Inventors: Yee-Ho Chia, Troy, MI (US); Janice Jones-Coleman, Grand Blanc, MI (US); Mohammad Parsian, Swartz Creek, MI (US); Kent A. Snyder, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/636,809

(22) Filed: Aug. 10, 2000

(51) Int. Cl.[7] .................. H01M 6/18; H01M 2/16
(52) U.S. Cl. ............. 429/316; 429/247; 429/249; 252/62.2
(58) Field of Search ............... 429/247, 249, 429/316; 252/62.2

(56) References Cited

U.S. PATENT DOCUMENTS

| | | | | |
|---|---|---|---|---|
| 3,852,113 A | | 12/1974 | Yokota et al. | |
| 4,039,732 A | * | 8/1977 | Schoen et al. | 526/43 |
| 5,252,413 A | * | 10/1993 | Alamgir et al. | 429/192 |
| 5,366,830 A | * | 11/1994 | Koksbang | 429/218 |
| 5,389,463 A | * | 2/1995 | Chang et al. | 429/142 |
| 5,460,904 A | * | 10/1995 | Gozdz et al. | 429/192 |
| 6,027,836 A | * | 2/2000 | Okada et al. | 429/314 |
| 6,355,380 B1 | * | 3/2002 | Yun et al. | 429/309 |

FOREIGN PATENT DOCUMENTS

| | | | | |
|---|---|---|---|---|
| DE | 4102958 A1 | | 5/1992 | |
| JP | 4-255664 A | * | 1/1991 | H01M/2/16 |
| JP | 6-223799 A | * | 8/1994 | H01M/2/16 |
| WO | 90/15838 | | 12/1990 | |

* cited by examiner

Primary Examiner—Patrick Ryan
Assistant Examiner—Julian Mercado
(74) Attorney, Agent, or Firm—Margaret A. Dobrowitsky

(57) ABSTRACT

Described is a rechargeable lithium ion battery comprised of (a) a negative electrode and (b) a positive electrode both comprised of a current collector and applied to each a mixture of chlorinated polymer blend and lithium intercalation materials and (c) a separator/ polymer electrolyte comprised of chlorinated polymer blend and filler.

20 Claims, No Drawings

LITHIUM ION RECHARGEABLE BATTERIES UTILIZING CHLORINATED POLYMER BLENDS

FIELD OF THE INVENTION

The present invention pertains to lithium ion rechargeable batteries utilizing polymer electrolytes.

BACKGROUND OF THE INVENTION

Rechargeable lithium batteries utilizing polymer electrolytes are well known see Handbook of Batteries by David Linden, (c) 1995, chapter 36. The basic structure contains a lithium anode, a polymer electrolyte, a cathode and a current collector.

Secondary, lithium-ion cells and batteries are well known in the art. One such lithium-ion cell comprises essentially a lithium-intercalatable carbonaceous anode, a lithium-intercalatable chalcogenide cathode, and a non-aqueous, lithium-ion-conducting electrolyte there between. The carbon anode comprises any of the various forms of carbon (e.g., coke or graphite) pressed into a porous conductor or bonded to an electrically conductive carrier (e.g. copper foil) by means of a suitable organic binder. A known chalcogenide cathode comprises a crystalline spinel form of manganese oxide bonded to an electrically conductive carrier (e.g., aluminum foil) by a suitable organic binder such as ethylene propylene diene monomer (EPDM).

Lithium-ion cell electrolytes comprise a lithium salt dissolved in a vehicle which may be (1) completely liquid, or (2) an immobilized liquid, (e.g. gelled, or entrapped in a polymer matrix), or (3) a pure polymer. Known polymer matrices for entrapping the electrolyte include polyacrylates, polyurethanes, polydialkylsiloxanes, polymethylacrylates, polyphosphazenes, polyethers, polyvinylidene fluorides and polycarbonates, and may be polymerized in situ in the presence of the electrolyte to trap the electrolyte therein as the polymerization occurs. Known polymers for pure polymer electrolyte systems include polyethylene oxide (PEO), polymethylene-polyethylene oxide (MPEO) or polyphosphazenes (PPE). Known lithium salts for this purpose include, for example, $LiPF_6$, $LiClO_4$, $LiBF_4$, $LiAsF_6$, $LiSbF_6$, $LiSCN$, $LiAlCl_4$, $LiCF_3SO_3$, $LiN(CF_3SO_2)_2$, $LiC(CF_3SO_2)_3$, $LiC_2F_5SO_3$, and $LiN(C_2F_5SO_2)_2$. Known organic solvents (i.e., vehicles) for the lithium salts in carbonate, ethylene carbonate, dialkyl carbonates, cyclic ethers, cyclic esters, glymes, lactones, formates, esters, sulfones, nitriles, and oxazolidinones.

Lithium cells made from pure polymer electrolytes, or liquid electrolytes entrapped in a polymer matrix, are known in the art as "lithium-polymer" cells, and the electrolytes therefore are known as polymeric electrolytes. Lithium-polymer cells are often made by laminating thin films of the anode, cathode and electrolyte together wherein the electrolyte layer is sandwiched between the anode and cathode layers to form an individual cell, and a plurality of such cells are bundled together to form a higher energy/voltage battery. In making such cells, it is desirable that the thin films are flexible and robust so that they can be handled without damage.

Frequently, polymer electrolytes utilized in lithium polymer batteries display high temperature instability due to the interaction of polymer binders and electrolytes resulting in dissolution and gelling. The use of such lithium polymer batteries therefore are limited in their use in starting, lighting and ignition (SLI) batteries, electric vehicle (EV) batteries, and hybrid vehicle (HV) batteries.

It is an object of the present invention to provide a chlorinated polymer based polymer electrolyte and electrodes for lithium ion rechargeable batteries. It is also an object of the present invention to provide polymer electrolytes and electrodes that are useful when operating at high temperatures.

SUMMARY OF THE INVENTION

Provided is a lithium ion rechargeable battery having a negative electrode, a positive electrode and a separator/polymer electrolyte there between comprising a chlorinated polymer. The polymer is comprised of a chlorinated polyvinyl chloride (PVC) blended with a terpolymer comprised of poly(vinylidene chloride-co-acrylonitrile-co-methyl methacrylate)s, poly(vinylidene chloride-co-methacrylonitrile-co-methyl methacrylate)s or combinations thereof.

Also provided is a negative electrode in a lithium ion rechargeable battery comprising a current collector and applied thereto a mixture of a chlorinated polymer and carbon-based materials. Also provided is a positive electrode in a lithium battery comprising a current collector and applied thereto a mixture of a chlorinated polymer and active materials.

Also provided is a separator in a lithium ion rechargeable battery, comprised of a chlorinated polymer and filler.

Also described is a lithium ion rechargeable battery comprised of (a) a negative electrode and (b) a positive electrode both comprised a current collector and applied to each, a mixture of a chlorinated polymer and active materials and (c) a separator comprised of a chlorinated polymer and filler.

Also provided is a method of manufacturing an electrode for use in a lithium ion rechargeable battery comprising preparing a mixture of a chlorinated polymer and active materials and applying the mixture to a substrate to be used as the electrode in the lithium ion rechargeable battery.

DETAILED DESCRIPTION OF THE PREFERRED EMBODIMENT

The present invention pertains to separator/polymer electrolytes and electrodes made of a chlorinated polymer useful in lithium ion batteries, preferably rechargeable lithium ion batteries.

The rechargeable lithium ion cells which use solid polymer electrolytes (SPE) or plasticized polymer electrolytes are considered to have a safety advantage over the organic liquid electrolytes because of the absence or reduced amount of a volatile, and sometimes flammable, organic solvent. In their most common forms, these cells use a lithium-ion conducting polymer membrane which acts both as the separator and as the electrolyte, carbon-containing material(s) backed by a metal current collector as the negative electrode or the anode, and transition metal oxide(s) or chalcogenide(s), blended with conductive carbon and backed by a metal current collector as the positive electrode or the cathode.

The cell reaction shown below is similar to that in a liquid organic electrolyte cell. The electrochemical process of the anode is the uptake of lithium ion during the charge and the release of lithium ion during the discharge. Therefore, the anode acts as lithium ion source whereas the cathode acts as lithium ion sink during the discharge.

Overall Reaction

Preferably, the chlorinated PVC is blended with a terpolymer of vinylidene chloride. It showed enhanced high temperature stability and also displayed mechanical integrity in the as-cast and extracted separator films. If using vinylidene chloride terpolymer alone as the polymer binder, the as-cast separator shows good mechanical properties, but it becomes very brittle with poor handelability after the removal of plasticizer, a step used to produce porous membrane. Separately, if using chlorinated PVC alone as the polymer binder, the as-cast separator film appears to be tacky and hence limits its application. It is the blending of chlorinated PVC and terpolymer of vinylidene chloride, which provides the most desirable mechanical properties.

Chlorinated PVC is a well-known commercially available material. A number of U.S. patents describe the manufacture and use of such materials such as, U.S. Pat. No. 5,821,304; and U.S. Pat. No. 5,789,543. Preferably, the amount of chlorine is at least 57 percent bound chlorine in the polymer. Preferred chlorinated PVC resins of different molecular weights and chlorine contents are available under the name TempRite (trademark of B.F. Goodrich of Cleveland, Ohio). It is preferred that the chlorinated PVC polymer is blended with other polymeric materials. Preferred polymeric materials to be blended with the chlorinated PVC are polymers of vinylidene chloride. Even more preferred polymers are those that are terpolymers of vinylidene chloride and different terpolymers.

Vinylidene chloride and poly (vinylidene chloride) are commercially available as Saran (trademark of Dow Chemical Company of Midland, Mich.) or PVDC. The preparation of such materials is disclosed in Kirk-Othmer: Encyclopedia of Chemical Technology, Third Edition, Vol 23 (New York: John Wiley & Sons, 1983), pp 764–798.

The term "PVDC" means a vinylidene chloride copolymer wherein a major amount of the copolymer comprises vinylidene chloride and a minor amount of the copolymer comprises one or more unsaturated monomers copolymerizable therewith. Examples of unsaturated monomers copolymerizable with the vinylidene chloride are vinyl chloride, acrylonitrile, and alkyl acrylates having 1 to 18 carbon atoms in the alkyl group. Preferred terpolymers of vinylidene chloride are poly(vinylidene chloride-co-acrylonitrile-co-methyl methacrylate)s, poly(vinylidene chloride-co-methacrylonitrile-co-methyl methacrylate)s and combinations thereof.

The ratio of chlorinated PVC to terpolymer of vinylidene chloride ranges from about 90 to 10 percent by weight to 40 to 60 percent by weight, preferably 75/25 percent, even more preferably 50/50 percent by weight.

Electrodes are made by mixing the active materials with a suitable binder in a solvent, coating the mix onto a suitable electrically conductive support (i.e., aluminum foil) or a substrate (e.g. Mylar or paper) and removing the solvent (e.g., by heat) as is well known in the art. Various coating means including spraying, spin-coating, blade-coating, electrostatic spraying, painting and the like can be used. Some conductive carbon particles may be mixed with the active material to improve its electrical conductivity as is also well known in the art. Such electrodes will typically comprise about 3% to about 20%, by weight, binder, and about 2% to about 15%, by weight, conductive carbon particles.

The separator film in a lithium ion battery is preferably prepared from a mixture of the chlorinated polymer blend, filler and plasticizer in an organic solvent such as tetrahydrofuran (THF). Preferably, the blend of polymeric materials that is utilized for the separator may likewise be utilized for the preparation of the anode and cathode. The slurry is then cast to a desirable thickness and dried.

The anode, the negative electrode, in a lithium ion battery is preferably prepared by mixing the chlorinated polymer blend, plasticizer with carbon-based materials in THF solvent. Suitable carbon-based materials consisted of graphite, coke, soft carbon, hard carbon, microfibrous graphite, coated graphite and combinations thereof.

The cathode, the positive electrode, in a lithium ion battery is preferably prepared by mixing the chlorinated polymer blend, plasticizer with cathode active material in THF solvent. Suitable cathode active materials consisted of lithium cobalt oxides, lithium nickel oxides, lithium nickel cobalt oxides, lithium manganese oxides, vanadium pentoxide and combinations thereof.

A variety of plasticizers may be utilized in the preparation of the electrodes. Such materials that may be dialkyl (8–12 carbon atoms) esters of various polycarboxylic acids or anhydrides such as citric acid, phthalic acid, and the like. Suitable materials are as follows: Citroflex A4 (trademark of Morflex for citric acid esters), dibutyl phthalate, dioctyl phthalate, dioctyl terephthalate, dioctyl adiapate, Citroflex A2, Citroflex A6 and combinations thereof.

Electrolytic cells, such as rechargeable battery cells, are constructed by means of a lamination of electrode and electrolyte cell elements, which may be prepared from the polymer composition, such as the blend of chlorinated polymer. In the construction of the battery, a metallic current collector of foil or grid is covered with a positive electrode film or membrane, which is separately prepared as a coated layer of a dispersion of intercalation electrode composition in polymer matrix solution which is dried to form the electrode. A separator/ polymer electrolyte membrane formed as a dried coating of a composition comprising a solution of the chlorinated polymer blend, filler and plasticizer is then placed upon the positive electrode film. A negative electrode membrane formed as a dried coating of a powdered carbon dispersion in the polymer matrix solution is likewise placed upon the separator membrane layer and a current collector is laid upon the negative electrode layer to complete the cell assembly. Seeing for example U.S. Pat. No. 5,460,904 and U.S. Pat. No. 5,456,000.

Plasticizer in the laminated cells is extracted using solven Typically, the extracted cells are subjected to vacuum drying at elevated temperature to remove the undesirable moisture associated with various materials or introduced from processes. The final activation of cells is the addition of electrolyte, i. e. lithium salt dissolved in a mixture of organic solvents, and this is typically conducted inside a dry box due to the moisture sensitivity of lithium salt. Suitable lithium salts include $LiPF_6$, $LiClO_4$, $LiBF_4$, $LiAsF_6$, $LiSbF_6$, $LiSCN$, $LiAlCl_4$, $LiCF_3SO_3$, $LiN(CF_3SO_2)_2$, $LiC(CF_3SO_2)_3$, $LiC_2F_5SO_3)_2$ and combinations thereof. Suitable organic so for the lithium salts include ethylene carbonate, dimethyl carbonate, propylene carbonate, diethyl carbonate, ethyl methyl carbonate, gamma butyrolactone, methyl formate,1,2-dimethoxyethane, diethoxyethane and combinations thereof.

A particular advantage of the polymer electrolytes utilized in the lithium battery described herein is the high temperature at which the battery may be utilized such as up to 100°

C., preferably 75° C. The chlorinated polymer blend-based polymer electrolyte system described herein, displays little or no dissolution or gelling at high temperature, namely 75° C.

Listed below are examples of the invention wherein all parts are parts by weight and all degrees are in degrees C., unless otherwise indicated.

EXAMPLE 1

A Saran F271 (S271) polymer film was made by first preparing a 25% S271 solution, and then casting it on a substrate, followed by air-drying. Then the electrolyte uptake test was conducted using the following procedure. First, the film was immersed in the electrolyte consisting of 1 M LiPF$_6$ in a ethylene carbonate (EC), and dimethyl carbonate (DMC)-based electrolyte for a week at room temperature (RT) and 75° C. respectively. Then, after wiping off the excess electrolyte on the surface, samples were then reweighed to determine the amount of absorbed electrolyte. The electrolyte uptake of the above samples at RT and 75° C. were 23% and 78% respectively. At 75° C., the tested polymer film remained intact, in sharp contrast to the complete dissolution normally observed if using polymer film made of copolymer of vinylidene fluoride and hexafluoropropylene (90: 10), known as Kynar Flex 2801 (trademark of Elf Atochem).

A TempRite 677×670 (T677) polymer film was made from casting a 15% solution separately. Based on similar swelling test, the amount of electrolyte absorbed by T677 film at RT and 75° C. were 33% and 65% respectively.

EXAMPLE 2

A separator film comprising 50/50, by weight, blend of TempRite 674×670 (T674) and Saran F281 (S281) was prepared by making separator slurry and then cast it on a desirable substrate using doctor blade. The initial slurry was made by adding 13.3 g of silanized fumed silica and 26.7 g of Citroflex A4 plasticizer to 53.3 g of THF, which was milled for 1 hour. Two polymer stock solutions were prepared separately; namely 25% Saran S281 and 15% TempRite T674. The final separator slurry was formed by adding 66.7 g of T674 solution, and 40 g of S281 solution to the initial slurry, which was milled for additional 4 hours. Typically the cast film was allowed to dry in air for about 30 minutes.

EXAMPLE 3

The plasticizer in the as-cast separator film comprising T674 and S281 was removed using an organic liquid, namely methanol, and the weight loss was about 44%. The extracted separator film was also used to conduct the same electrolyte uptake test as described in Example 1. The amount of electrolyte absorbed by the extracted separator film at RT and 75C were 90% and 167% respectively.

EXAMPLE 4

Cathode slurry was made using the following procedure. An additive mixture was prepared by adding 3.7 g of additive and 17.4 g of Citroflex A4 plasticizer to 30.5 g of THF, followed by milling for 2 hours. Then, 72.4 g of 15% of T674 solution was added, and mixing continued for 30 minutes. Finally, after the addition of 5.9 g of conductive carbon, namely Super P (trademark of MMM Carbon of Belgium for conductive carbon), and 70.2 g of lithium manganese oxide (LMO), additional mixing was conducted for 2 hours.

In addition, anode slurry was prepared using the following procedure. The solution mixture composed of 90.8 g of 15% T674 solution, 17.8 g of Citroflex A4 plasticizer and 39.9 g of THF was mixed for 1 hour. After adding 49.8 g of graphite, namely BG35 (trademark of Superior Graphite), and 1.8 g of Super P, the slurry was mixed for 2 hours.

The cathode and anode films were formed using the above cathode and anode slurries and following similar procedure as described for separator film.

EXAMPLE 5

Laminated cells were constructed by first making cathode and anode laminates respectively and then the final laminate. Both aluminum and copper current collectors were treated with coating fluid containing polymer and conductive carbon. The cathode laminate was formed by placing aluminum current collector between a pair of cathode film and an outer separator, and by laminating the composite at about 130C under moderate pressure. Similar procedure was used to make anode laminate consisting of a copper current collector sandwiched between an anode film and an outer separator. The test cell was then made by placing a separator film between a pair of cathode laminate and anode laminate, followed by final lamination at about 150C.

The plasticizer in laminated cells was extracted using methanol, and a two-bath process was employed to ensure the complete removal of plasticizer. Vacuum drying of extracted cells was conducted in a heated vacuum oven with a mechanical pump for overnight, followed by packaging. Then the activation process consisted of adding a predetermined amount of electrolyte to cells was performed inside a dry box. The electrolyte typically consists of 1 M LiPF6 in EC/DMC-based solvent.

The activated cells were subjected to a typical formation process before conducting further electrochemical characterization including charge-discharge cycles at C/2, 1C, 2C and 4C rates with voltages between 3.0 and 4.2 volt. The definition of a discharge rate of C/2 is that the rated capacity is delivered in 2 h. Our test results showed that the C/2 discharge capacity of one typical cell was 35 mAh, and the ratio of 4C capacity to C/2 capacity was 88%.

While the forms of the invention herein disclosed constitute presently preferred embodiments, many others are possible. It is not intended herein to mention all of the possible equivalent forms or ramifications of the invention; it is understood that the terms used herein are merely descriptive rather than limiting and that various changes may be made without departing from the spirit or scope of the invention.

What is claimed is:

1. A lithium ion rechargeable battery having a negative electrode and a positive electrode and a separator/polymer electrolyte therebetween comprised of a chlorinated polymer wherein the chlorinated polymer is comprised of a chlorinated polyvinyl chloride (PVC) polymer blended with a terpolymer comprised of poly(vinylidene chloride-co-methacrylonitrile-co-methyl methacrylate)s, poly (vinylidene chloride-co-acrylonitrile-co-methyl methacrylate)s or combinations thereof.

2. The battery of claim 1 wherein the amount of chlorinated PVC in the polymer blend ranges 50–95% by weight and polyvinylidene chloride terpolymer ranges 50–5%.

3. The battery of claim 1 wherein the chlorinated PVC is comprised of copolymers of different molecular weights and different chlorine content.

4. A positive electrode in a lithium ion rechargeable battery comprising a current collector and applied thereto a mixture of a chlorinated polymer and positive electrode active materials wherein the chlorinated polymer is comprised of a chlorinated polyvinyl chloride (PVC) polymer blended with a terpolymer comprised of poly(vinylidene chloride-co-methacrylonitrile-co-methyl methacrylate)s, poly(vinylidene chloride-co-acrylonitrile-co-methyl methacrylate)s or combinations thereof.

5. The positive electrode of claim 4 wherein the active materials is comprised of lithium cobalt oxides, lithium nickel oxides, lithium nickel cobalt oxides, lithium manganese oxides, vanadium pentoxides or combinations thereof.

6. The positive electrode of claim 4 wherein the amount of chlorinated PVC in the polymer blend ranges 50–100% by weight and polyvinylidene chloride terpolymer ranges up to 50%.

7. The positive electrode of claim 4 wherein the chlorinated PVC is comprised of copolymers of different molecular weights and different chlorine content.

8. A negative electrode in a lithium ion rechargeable battery comprising a current collector and applied thereto a mixture of a chlorinated polymer and negative electrode active materials containing carbon-based intercalation materials wherein the chlorinated polymer is comprised of a chlorinated polyvinyl chloride (PVC) polymer blended with a terpolymer comprised of poly(vinylidene chloride-co-methacrylonitrile-co-methyl methacrylate)s, poly(vinylidene chloride-co-acrylonitrile-co-methyl methacrylate)s or combinations thereof.

9. The negative electrode of claim 8 wherein the intercalation material is comprised of graphite, coke, soft carbon, hard carbon or combinations thereof.

10. The negative electrode of claim 8 wherein the amount of chlorinated PVC in the polymer blend ranges 50–100% by weight and polyvinylidene achloride terpolymer ranges up to 50%.

11. The negative electrode of claim 8 wherein the chlorinated PVC is comprised of copolymers of different molecular weights and different chlorine content.

12. A separator/polymer electrolyte in a lithium ion rechargeable battery comprised of a chlorinated polymer and filler wherein the chlorinated polymer is comprised of a chlorinated polyvinyl chloride (PVC) polymer blended with a terpolymer comprised of poly(vinylidene chloride-co-methacrylonitrile-co-methyl methacrylate)s, poly(vinylidene chloride-co-acrylonitrile-co-methyl methacrylate)s or combinations thereof.

13. The separator/polymer electrolyte of claim 11 wherein the amount of chlorinated PVC in the polymer blend ranges 50–95% by weight and polyvinylidene chloride terpolymer ranges 50–5%.

14. The separator/polymer electrolyte of claim 11 wherein the chlorinated PVC is comprised of copolymers of different molecular weights and different chlorine content.

15. A lithium ion rechargeable battery comprised of (a) a negative electrode and (b) a positive electrode both comprised of a current collector and applied to each a mixture of a chlorinated polymer and lithium intercalation materials and (c) a separator/ polymer electrolyte comprised of a chlorinated polymer and filler wherein the chlorinated polymer is comprised of a chlorinated polyvinyl chloride (PVC) polymer and blended with a terpolymer comprised of poly (vinylidene chloride-co-methacrylonitrile-co-methyl methacrylate)s, poly(vinylidene chloride-co-acrylonitrile-co-methyl methacrylate)s or combinations thereof.

16. The battery of claim 15 wherein the amount of chlorinated PVC in the polymer blend ranges 50–95% by weight and polyvinylidene chloride terpolymer ranges 50–5%.

17. The battery of claim 15 wherein the chlorinated PVC is comprised of copolymers of different molecular weights and different chlorine content.

18. A method of manufacturing an electrode for use in a lithium ion rechargeable battery comprising preparing a mixture of a chlorinated polymer and lithium intercalation materials and applying the mixture to a substrate to be used as the electrode in the lithium battery wherein the chlorinated polymer is comprised of a chlorinated polyvinyl chloride (PVC) polymer blended with a terpolymer comprised of poly(vinylidene chloride-co-methacrylonitrile-co-methyl methacrylate)s, poly(vinylidene chloride-co-acrylonitrile-co-methyl methacrylate)s or combinations thereof.

19. The method of claim 18 wherein the amount of chlorinated PVC in the polymer blend ranges 50–95% by weight and polyvinylidene chloride terpolymer ranges 50–5%.

20. The method of claim 18 wherein the chlorinated PVC is comprised of copolymers of different molecular weights and different chlorine content.

* * * * *